(12) United States Patent
Zheng et al.

(10) Patent No.: US 12,217,150 B2
(45) Date of Patent: Feb. 4, 2025

(54) DATA PROCESSING METHOD AND APPARATUS BASED ON RECURRENT NEURAL NETWORK, AND DEVICE

(71) Applicant: BEIJING BAIDU NETCOM SCIENCE AND TECHNOLOGY CO., LTD., Beijing (CN)

(72) Inventors: Huihuang Zheng, Beijing (CN); Xiang Lan, Beijing (CN); Yamei Li, Beijing (CN); Liujie Zhang, Beijing (CN); Fei Guo, Beijing (CN); Yanjun Ma, Beijing (CN); Dianhai Yu, Beijing (CN)

(73) Assignee: Beijing Baidu Netcom Science and Technology Co., LTD, Beijing (CN)

( * ) Notice: Subject to any disclaimer, the term of this patent is extended or adjusted under 35 U.S.C. 154(b) by 1062 days.

(21) Appl. No.: 17/248,131

(22) Filed: Jan. 11, 2021

(65) Prior Publication Data
US 2021/0406641 A1  Dec. 30, 2021

(30) Foreign Application Priority Data
Jun. 28, 2020  (CN) .......................... 202010600160.5

(51) Int. Cl.
*G06N 3/044* (2023.01)
*G06N 3/08* (2023.01)

(52) U.S. Cl.
CPC ............... *G06N 3/044* (2023.01); *G06N 3/08* (2013.01)

(58) Field of Classification Search
CPC .......... G06N 3/044; G06N 3/08; G06N 3/045; G06N 3/084; G06N 3/04; Y02D 10/00;
(Continued)

(56) References Cited

U.S. PATENT DOCUMENTS

2019/0172466 A1* 6/2019 Lee ...................... G06F 40/58
2019/0340236 A1* 11/2019 Le ........................ G06F 40/30
(Continued)

FOREIGN PATENT DOCUMENTS

CN  109271522 A  1/2019
CN  109635923 A  4/2019

OTHER PUBLICATIONS

Office Action for Japanese Application No. 2021-001796, mailed on Feb. 16, 2022, 6 pages.
(Continued)

*Primary Examiner* — Jennifer N Welch
*Assistant Examiner* — Amy P Hoang
(74) *Attorney, Agent, or Firm* — Banner & Witcoff, Ltd.

(57) ABSTRACT

A data processing method and apparatus based on a recurrent neural network and a device are provided. The recurrent neural network includes multiple recurrent units, each recurrent unit includes multiple data processing nodes and a start node, at least one recurrent unit includes an end node, and at least one data processing node is included between the start node and the end node. During the processing of the first target processing object in a first recurrent unit, in a case that the first target processing object does not satisfy the first preset condition, the start node in the first recurrent unit is run to add a tag to the data processing nodes subsequent to the start node and stop addition of the tag in response to reaching the end node, and no processing is performed by the data processing nodes with the tag.

17 Claims, 7 Drawing Sheets

(58) Field of Classification Search
CPC ......... G10L 15/04; G10L 15/16; G10L 15/26; G10L 25/78; G10L 2025/783
See application file for complete search history.

(56) References Cited

U.S. PATENT DOCUMENTS

2020/0082260 A1    3/2020  Hammoud et al.
2021/0019604 A1*   1/2021  Corrado ................ G06N 3/047

OTHER PUBLICATIONS

Yan, Ke et al., "Natural language processing method based on cyclic neural network," Nanjing University of Information Science and Technology. Oct. 1, 2018: pp. 1-3.
Jul. 31, 2023—(CN) First Search Report—App. No. 2020106001605 w/ machine translation.
Oct. 16, 2023—(CN) First Office Action—App. No. 202010600160.5 w/ machine translation.
Campos V., et al., "Skip RNN: Learning to Skip State Updates in Recurrent Neural Networks," Feb. 5, 2018, XP055810193, Retrieved from the Internet: URL:https://arxiv.org/pdf/1708.06834.pdf on Jun. 2, 2021, 17 pages.
Extended European Search Report for Application No. 20213649.5 mailed on Jun. 18, 2021, 11 pages.
Hansen C., et al., "Neural SpeedReading with Structural-Jump-LSTM," ICLR 2019, Apr. 2, 2019, XP055810195, Retrieved from the Internet: URL:https://arxiv.org/pdf/1904.00761.pdf on Jun. 2, 2021, 10 pages.
Sigurdsson G.A., et al., "Learning Visual Storylines with Skipping Recurrent Neural Networks," Advances in Intelligent Data Analysis XIX, Jul. 26, 2016, Springer International Publishing, Cham, XP055810188, ISSN: 0302-9743, ISBN: 978-3-030-71592-2, vol. 9909, DOI: 10.1007/978-3-319-46454-1_5, Retrieved from the Internet: URL:https://arxiv.org/pdf/1604.04279.pdf, pp. 71-88.
Zhang S., et al., "Trainable Dynamic Subsampling for End-to-End Speech Recognition," Interspeech 2019, Sep. 15, 2019, XP055810395, ISCA DOI: 10.21437/Interspeech.2019-2778, Retrieved from the Internet: URL:https://www.isca-speech.org/archive_v0/Interspeech_2019/pdfs/2778.pdf on Jun. 2, 2021, pp. 1413-1417.

* cited by examiner

DATA PROCESSING METHOD AND APPARATUS BASED ON RECURRENT NEURAL NETWORK, AND DEVICE

CROSS-REFERENCE TO RELATED APPLICATION

This application claims priority to Chinese patent application No. 202010600160.5, filed on Jun. 28, 2020, which is hereby incorporated by reference in its entirety.

TECHNICAL FIELD

The present application relates to the field of artificial intelligence, in particular to the field of deep learning.

BACKGROUND

A Recurrent Neural Network (RNN) is a kind of neural network which takes sequence data as an input and performs cyclic, or "loop" processing on the sequence data.

SUMMARY

The present application provides a data processing method and apparatus based on a recurrent neural network, and a device.

In a first aspect, the present application provides a data processing method based on a recurrent neural network, the recurrent neural network includes a plurality of recurrent units, each recurrent unit includes a plurality of data processing nodes, wherein each recurrent unit further includes a first start node, at least one of the recurrent units further includes a first end node, at least one of the data processing nodes is included between the first start node and the first end node, and the data processing method based on the recurrent neural network includes:

inputting a plurality of target processing objects into the plurality of recurrent units, respectively;

sequentially processing the respective target processing objects by the plurality of data processing nodes in the respective recurrent units, to obtain a plurality of processing results output by the plurality of recurrent units;

wherein the plurality of recurrent units include a first recurrent unit, judging whether a first target processing object satisfies a first preset condition during the processing of the first target processing object in the first recurrent unit, and in a case that the first target processing object does not satisfy the first preset condition, no processing being performed by the data processing nodes between the first start node and the first end node during the processing of the first target processing object by the plurality of data processing nodes in the first recurrent unit.

In a second aspect, the present application provides a data processing apparatus based on a recurrent neural network, the recurrent neural network includes a plurality of recurrent units, each recurrent unit includes a plurality of data processing nodes, wherein each recurrent unit further includes a first start node, at least one of the recurrent units further includes a first end node, at least one of the data processing nodes is included between the first start node and the first end node, and the data processing apparatus based on the recurrent neural network includes:

an input module configured for inputting a plurality of target processing objects into the plurality of recurrent units, respectively;

a processing module configured for sequentially processing the respective target processing objects by the plurality of data processing nodes in the respective recurrent units, to obtain a plurality of processing results output by the plurality of recurrent units;

wherein the plurality of recurrent units include a first recurrent unit, and the processing module is configured for:

judging whether a first target processing object satisfies a first preset condition during the processing of the first target processing object in the first recurrent unit, and in a case that the first target processing object does not satisfy the first preset condition, no processing being performed by the data processing nodes between the first start node and the first end node during the processing of the first target processing object by the plurality of data processing nodes in the first recurrent unit.

It is to be understood that the contents in this section are not intended to identify the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the application and are not to be construed as limiting the application. Wherein.

Figure 1:
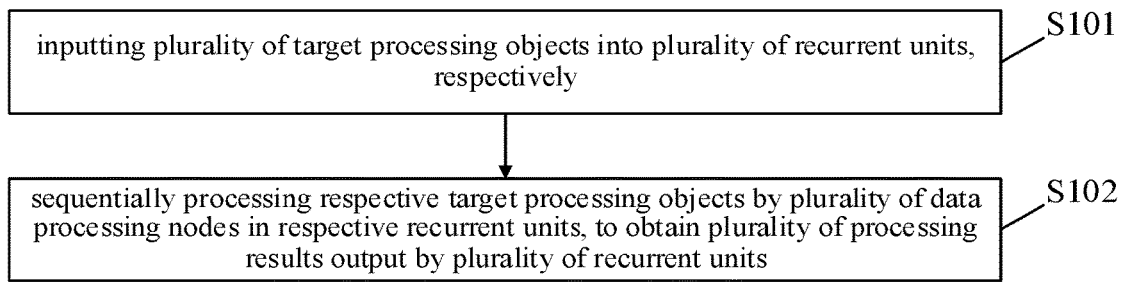
FIG. 1 is a flowchart of a data processing method based on a recurrent neural network according to an embodiment of the present application.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Reference will now be made in detail to the exemplary embodiments of the present application, examples of which are illustrated in the accompanying drawings, wherein the various details of the embodiments of the present application are included to facilitate understanding and are to be considered as exemplary only. The word "exemplary" is used herein to mean "serving as an example, instance, or illustration." Any embodiment or design described herein as "exemplary" is not necessarily to be construed as preferred or advantageous over other embodiments or designs. Accordingly, a person skilled in the art should appreciate that various changes and modifications can be made to the embodiments described herein without departing from the scope and spirit of the present application. Also, some descriptions of well-known functions and structures are omitted from the following description for clarity and conciseness.

The flexibility of conventional recurrent neural networks is limited when using loops because parts of processing in the cycle cannot be skipped according to the processing requirements of target processing objects. For example, some invalid target processing objects cannot be filtered, such as noise in audio or speech processing, black screen images in image recognition and the like.

The embodiments of the present application provide a data processing method based on a recurrent neural network, and relate to the fields of cloud computing, artificial intelligence and deep learning. The recurrent neural network includes a plurality of recurrent units, each recurrent unit includes a plurality of data processing nodes, wherein each recurrent unit further includes a first start node, at least one of the recurrent units further includes a first end node, and at least one of the data processing nodes is included between the first start node and the first end node.

Referring to FIG. 1, which is a flowchart of the data processing method based on the recurrent neural network according to an embodiment of the present application.

At S101, a plurality of target processing objects are input into the plurality of recurrent units, respectively.

At S102, the respective target processing objects are sequentially processed by the plurality of data processing nodes in the respective recurrent units, to obtain a plurality of processing results output by the plurality of recurrent units.

Wherein the plurality of recurrent units include a first recurrent unit. Whether a first target processing object satisfies a first preset condition is judged during the processing of the first target processing object in the first recurrent unit, and in a case that the first target processing object does not satisfy the first preset condition, no processing being performed by the data processing nodes between the first start node and the first end node during the processing of the first target processing object by the plurality of data processing nodes in the first recurrent unit.

The benefits of doing so are that the start node is triggered in a case that the target processing object does not satisfy the preset condition, so that the recurrent units skip the processing between the first start node and the first end node (for example, the current recurrent unit is skipped), or alternatively, the cycles of the neural network is directly interrupted. This provides and improves the flexibility of the recurrent neural network as it cycles, reduces the redundant calculation of the recurrent neural network, and improve the operating efficiency of the recurrent neural network.

In an embodiment of the present application, the first recurrent unit may represent any of the plurality of recurrent units, and the first target processing object may represent any of the plurality of target processing objects, and "the first" herein does not define a sequence.

In an embodiment, the target processing objects may include at least one of: video files, audio files, image files, and text files. The processing of the target processing object by the recurrent unit in S102 may include identifying, converting or classifying the target processing object, etc.

Taking the speech-to-text processing of an audio file as an example, the plurality of target processing objects in S101 are multiple audio files obtained by splitting the same audio file. In S102, the preset condition can be that the audio intensity is greater than a preset threshold value, and in a case that the audio input into the recurrent unit does not satisfy the preset condition, corresponding processing on the audio is not executed.

The benefits of doing so include that the embodiments of the present application can be widely applied to identifying of, for example, video, image, text and audio and etc. In an embodiment, in S102, in a case that the first target processing object satisfies the first preset condition, no processing is performed by the first start node in the first recurrent unit, and processing is performed on the first target processing object by the plurality of data processing nodes in the first recurrent unit.

The benefits of doing so include that the first start node is not triggered in a case that the target processing object satisfies the first preset condition, ensuring that the recurrent unit processes the target processing object normally.

In an embodiment of the recurrent neural network, the first end node is provided as the first node of each recurrent unit.

The benefits of doing so include that, in S102, in a case that the target processing object does not satisfy the first preset condition, it is possible to skip the processing of the target processing object which does not satisfy the condition currently, thereby continue the processing of the next target processing object by the next recurrent unit. A continue function in the recurrent neural network is thus achieved.

Figure 2:
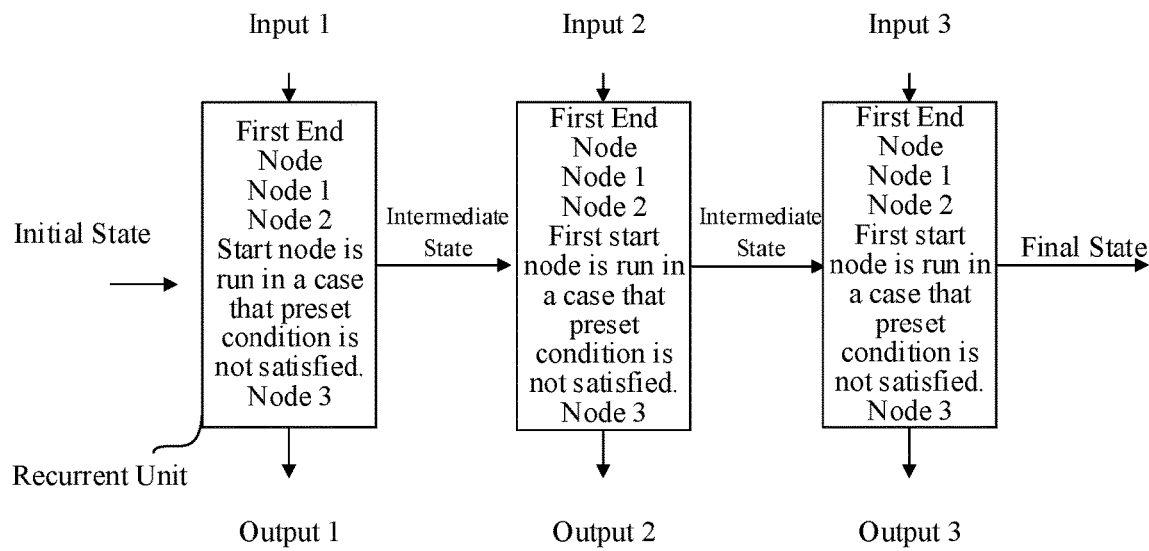
FIG. 2 is a first exemplary diagram of the recurrent neural network according to an embodiment of the present application.

Referring to FIG. 2, the recurrent neural network shown in FIG. 2 includes a plurality of recurrent units, and each recurrent unit includes a first end node, a node 1, a node 2, a first start node, and a node 3 in sequence, wherein the node 3 is a data processing node. The state information is propagated when the recurrent units iterate, and the state information includes corresponding information stored in the recurrent unit iteration process. Referring to FIG. 2, the initialized state information is recorded as an initial state, the state information propagated between the recurrent units is recorded as an intermediate state, and the state information after the last recurrent unit ends is recorded as a final state. Each recurrent unit needs to rely on the state transmitted by the previous recurrent unit to obtain corresponding output during the processing of the target processing objects.

In an embodiment, in S102, the no processing being performed by the data processing nodes between the first start node and the first end node, includes:

starting a first start node to add a first tag to a data processing node subsequent to the first start node and stop addition of the first tag in response to reaching a first end node, and no processing being performed by the data processing nodes with the first tag.

When the recurrent neural network of FIG. 2 is operated, a target processing object is input into the first recurrent unit, and the nodes in the recurrent unit are sequentially executed. Whether the target processing object satisfies the first preset condition is judged in response to reaching the first start node, and in a case that the target processing object does not satisfy the first preset condition, the first start node is run to add a first tag to the data processing node 3 subsequent to the first start node and stop the addition of the first tag in response to reaching the first end node of the second recurrent unit. Since no processing is performed by the node 3 added with the first tag, the node 3 may be skipped to continue processing of the next target processing object by the next recurrent unit.

The above embodiment may be applied to natural text processing, for example, and processing of irrelevant sentences may be skipped. Wherein the irrelevant sentences may include at least one of: headings, preambles, irrelevant spaces and section numbers included at the beginning of the text, end symbols such as periods or line breaks included at the end of the text, and references and appendices, etc. For another example, it may be applied to speech processing, and undesired audio signals in speech processing such as noise or intermediate pauses may be skipped. For yet another example, it may be applied to image recognition, and processing of images such as a start frame, an end frame and a black screen may be skipped. Therefore, redundant operation of the neural network is eliminated, and the processing speed of the neural network is accelerated.

An example of filtering noise in speech-to-text processing is described below.

Figure 3:
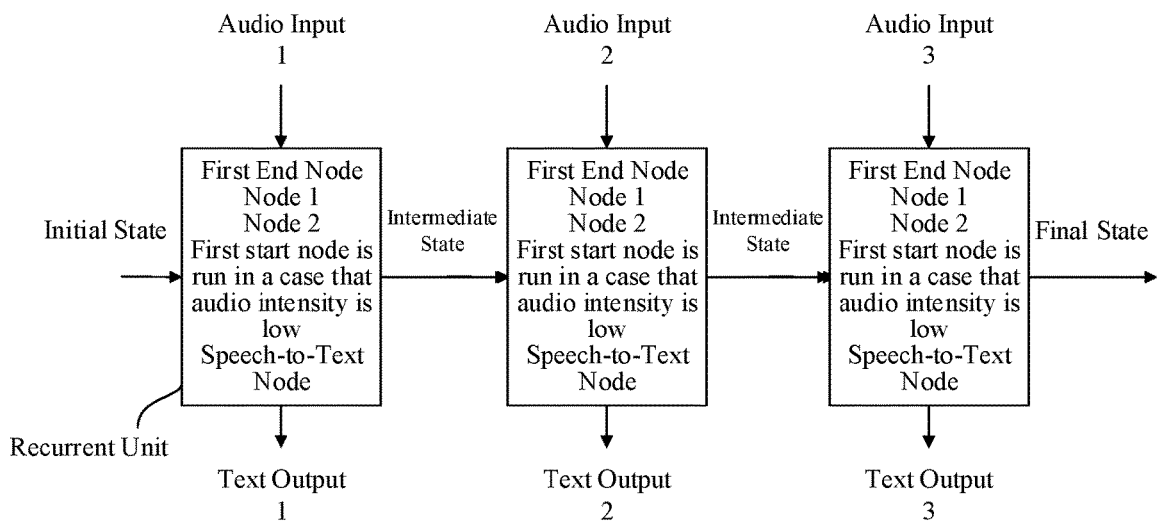
FIG. 3 is a second exemplary diagram of the recurrent neural network according to an embodiment of the present application.

Referring to FIG. 3, an audio signal is split into an audio input 1, an audio input 2, and an audio input 3 in chronological order. The data processing node subsequent to the first start node in the recurrent unit is a speech-to-text processing node, and a preset condition for triggering the first start node is set to be that the audio intensity exceeds a preset threshold value.

For example, the audio input 1 is input into the first recurrent unit, the audio intensity of the audio input 1 does not satisfy a preset condition of exceeding a preset threshold value, a first start node is executed, the speech-to-text processing of the node 3 is skipped, the first end node of the next recurrent unit is reached, and the processing of the audio input 2 by the next recurrent unit is started. As can be seen, the recurrent neural network shown in FIG. 3 can execute a continue-cycle operation, skip the processing of audio signals with too low audio intensity, filter noise interference, and accelerate the neural network operation.

In an embodiment, the first end node is provided downstream in the last one of the plurality of recurrent units. Alternatively, the input of the first end node is designated as the final state of the plurality of recurrent units.

The benefits of doing so include that, in S102, in a case that that the target processing object does not satisfy the first preset condition, no processing is performed by the nodes of all recurrent units subsequent to the recurrent unit until the first end node after the end of the last recurrent unit is reached, and a break function in the deep learning recurrent neural network is realized.

Figure 4:
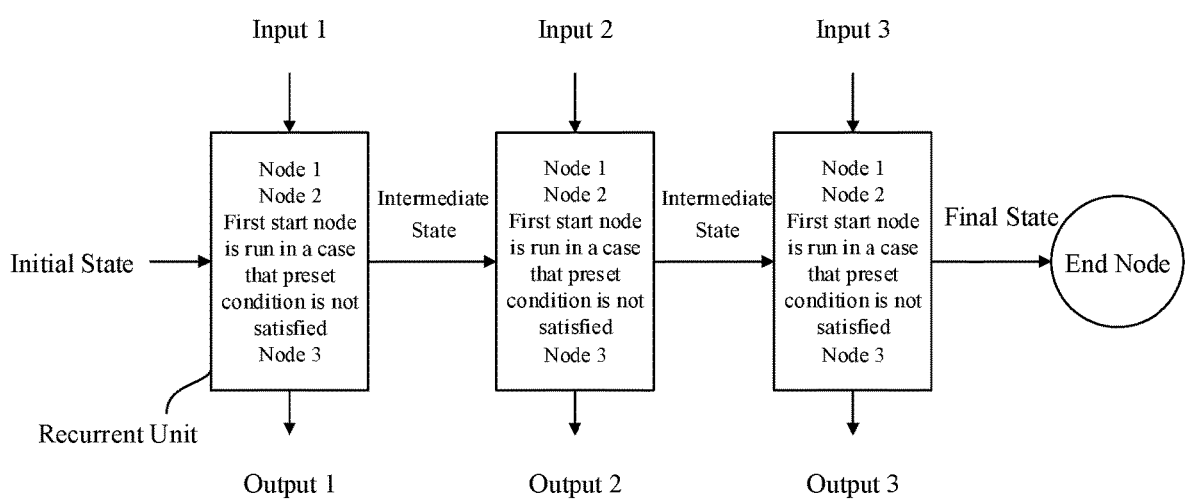
FIG. 4 is a third exemplary diagram of the recurrent neural network according to an embodiment of the present application.

Referring to FIG. 4, the recurrent neural network shown in FIG. 4 includes three recurrent units, each of which sequentially includes a node 1, a node 2, a first start node and a node 3, wherein the node 3 is a data processing node. The first end node is inserted at the end of the last recurrent unit, in a case that the input of the recurrent unit does not satisfy the preset condition, the first start node is triggered to be executed, a plurality of subsequent recurrent units are not executed until the first end node is reached. At the moment, the cycle of the recurrent neural network is stopped, and a break function in the deep learning recurrent neural network is realized.

The above embodiment may be applied to deep learning for video processing, wherein the video consists of many images, and each image is called as a frame. Common recurrent neural networks take each frame of image of a video as an input to each recurrent unit of the recurrent neural network. There are ending songs at the end of many videos, multiple image frames of the ending songs are not required to be processed, and redundancy operation is eliminated by the break function of the recurrent neural network, and thus the operation of the neural network is accelerated.

In an embodiment, each recurrent unit further includes a second start node, the at least one recurrent unit further includes a second end node, the second start node is located between the first start node and the first end node, and a second preset condition is provided with respect to each recurrent unit.

During the processing of the first target processing object in the first recurrent unit, the data processing method further includes: judging whether the first target processing object satisfies the second preset condition, in a case that the first target processing object satisfies the first preset condition; no processing being performed by the data processing nodes between the second start node and the second end node during the processing of the first target processing object by the plurality of data processing nodes in the first recurrent unit, in a case that the first target processing object does not satisfy the second preset condition. An example of skipping the multiple image frames of the ending songs when animals in the video images are captured is described below.

Figure 5:
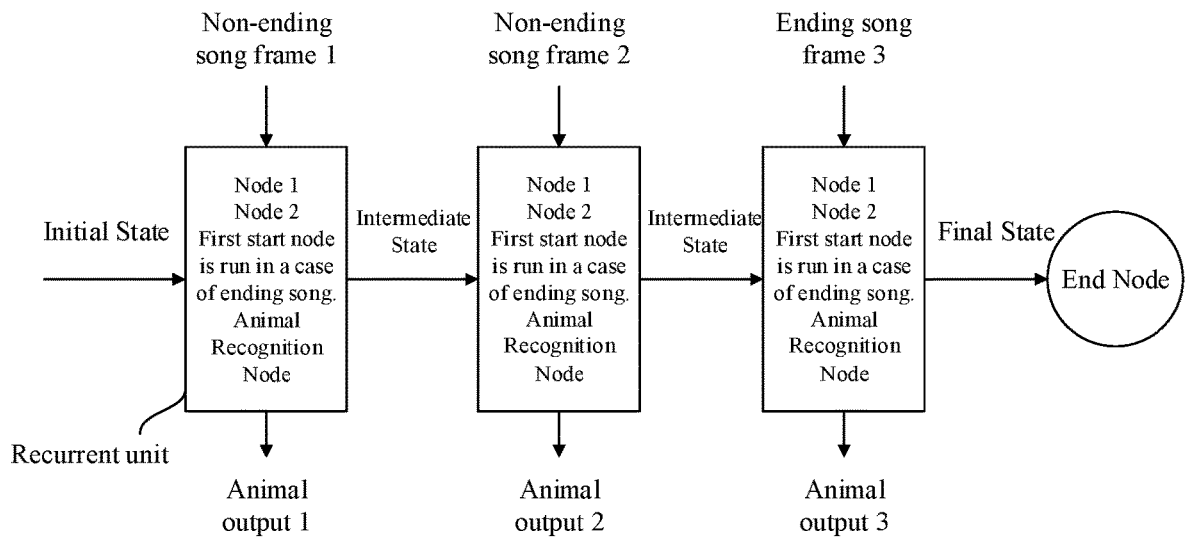
FIG. 5 is a fourth exemplary diagram of the recurrent neural network according to an embodiment of the present application.

Referring to FIG. 5, the video will be split into multiple image frames in chronological order, and the first preset condition in the recurrent unit is set to be a non-ending song frame. The data processing node subsequent to the first start node in the recurrent unit is an animal recognition node.

In FIG. 5, the inputs of the three recurrent units are a non-ending song frame 1, a non-ending song frame 2 and an ending song frame 3 in sequence. In a case that the recurrent neural network operates to the ending song frame 3, the image classification discriminator judges the frame image as an ending song, triggers the execution of a first start node, skips the cycle of the recurrent unit and reaches a first end node. Thus, the processing of the ending song may be skipped by breaking the cycle.

In an embodiment, no processing being performed by the data processing nodes between the second start node and the second end node, including:

the second start node is started to add a second tag to a data processing node subsequent to the second start node and stop addition of the second tag in response to reaching the second end node, and no processing being performed by the data processing nodes with the second tag.

Optionally, after S102, the data processing method further includes: a final prediction result is obtained according to the processing results obtained by the plurality of recurrent units. For example, after animal recognition is performed on a multi-frame image file in a video segment, animals appearing in the video segment are predicted based on the recognition result of the multi-frame image file.

In an embodiment, both the first start node and the first end node carry a first tag;

in S102, the starting the first start node in the first recurrent unit to add the first tag to the data processing nodes subsequent to the first start node and stop addition of the first tag in response to reaching the first end node, comprises:

(a) running the first start node in the first recurrent unit to obtain variable parameters carrying the first tag;

(b) sequentially transmitting the variable parameters carrying the first tag by the data processing nodes subsequent to the first start node; and (c) when the variable parameters carrying the first tag are transmitted to the first end node, if the first tag carried by the variable parameters is the same as the tag carried by the first end node, the first end node will clear the tag carried by the variable parameters; and if the first tag carried by the variable parameters is not the same as the first tag carried by the first end node, the first end node will not clear the first tag carried by the variable parameters and transmit the variable parameters carrying the first tag to the next node.

Optionally, a tag pos may include at least one of letters, numbers, and symbols, such as pos=1. For the first start node and the first end node, variable parameters vars (variables) input and output by the first start node and the first end node can be specified, and the first start node and the first end node output the same variable parameters vars according to the input variable parameters vars.

The benefits of doing so include that the mechanism of the first tag transmitted to the data processing nodes subsequent to the first start node is realized in such a way that the variable parameters output by the node carries the first tag.

The above embodiment is implemented as follows: the nodes subsequent to the start node are all added with and transmit the tag pos of the start node, which tags the data structure encapsulated with the input and output vars. Every node tagged with a pos number is not executed in the process of operating a computation graph composed of nodes. A placeholder is created for input and output of the node which is not executed, so that the node still has input and output variable parameters; the output parameter encapsulation carries the tag pos, and the tag pos is transmitted in each node along with variable parameters serving as input and output parameters of the nodes. In a case that the end node with the same tag pos is encountered, the end node clears the tag pos carried in the variable parameters, and the variable parameters received by subsequent nodes no longer carry the tag pos, so that the transmission of the tag pos is stopped. Since each node subsequent to the end node is not added with and transmit the pos tag, each node subsequent to the end node can be normally executed.

In particular, deep learning includes both forward and reverse processes. For the forward process, goto_op indicates the start node, and goto_end_op indicates the end node; for the reverse process, goto_grad_op indicates the start node, and goto_end_grad_op indicates the end node. Pos indicates the tag and vars indicates the variable parameters. The remaining nodes in the recurrent unit, such as data processing nodes, are indicated by op.

(1) The forward process of implementing the start node and the end node is as follows.

Figure 6:
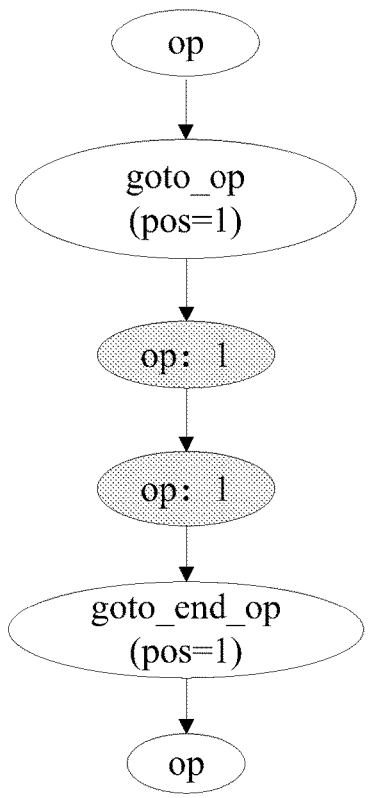
FIG. 6 is a first exemplary static computation graph according to an embodiment of the present application.

Referring to FIG. 6, an example of a static computation graph forward is shown. In FIG. 6, when the step is executed to goto_op (pos=1), goto_op outputs a tag pos=1, the op subsequent to goto_op transmits the tag pos=1 sequentially, the op transmitting the tag pos is indicated by "op: 1" for the op transmitting the tag pos, the op transmitting the tag pos is not executed until pos=1 is transmitted to goto_end_op (pos=1). Since the tag of goto_end_op is also pos=1, goto_end_op no longer outputs pos=1, so that op subsequent to goto_end_op no longer transmits the tag and can be executed normally.

Figure 7:
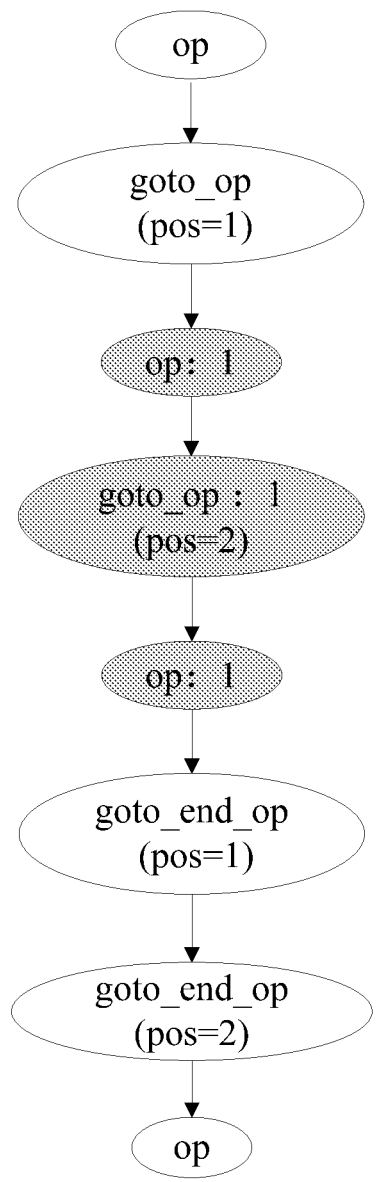
FIG. 7 is a second exemplary static computation graph according to an embodiment of the present application.

FIG. 6 is a case where goto_op and goto_end_op with the same tag are included in a forward network, and for a case where a plurality of goto_op and goto_end_op are tagged differently, an example is illustrated in FIG. 7. In FIG. 7, when the step is executed to goto_op (pos=1), goto_op outputs a tag pos=1, the op subsequent to goto_op sequentially transmits the tag pos=1, the op transmitting the tag pos is indicated by "op: 1", and the op transmitting the tag pos is not executed. Until pos=1 is transmitted to goto_end_op (pos=1), because their tags are the same, goto_end_op no longer outputs pos=1, so that op subsequent to goto_end_op no longer transmits the tag and can be executed normally.

It shall be noted that goto_op (pos=2) will not output pos=2 because no processing is performed by goto_op (pos=2). Since pos=2 is not transmitted, goto_end_op (pos=2) is not required to clear the tag pos=2 for the output variable parameters.

Therefore, based on a plurality of tags, a plurality of groups of start nodes and end nodes can be nested in the recurrent neural network, so that a plurality of preset conditions can be set for the target processing objects, and the flexibility is higher.

(2) The reverse process of implementing the start node and the end node is as follows.

goto_end_grad_op implements the operation of goto_op, namely outputting the tag pos and enabling the subsequent op to transmit the tag; and goto_grad_op implements the operation of goto_end_op, i.e. the transmitting of the tag pos is ended. In addition, goto_end_grad_op is determined to be executed according to a record that goto_end_op corresponding to the forward process has cleared the tag.

Figure 8:
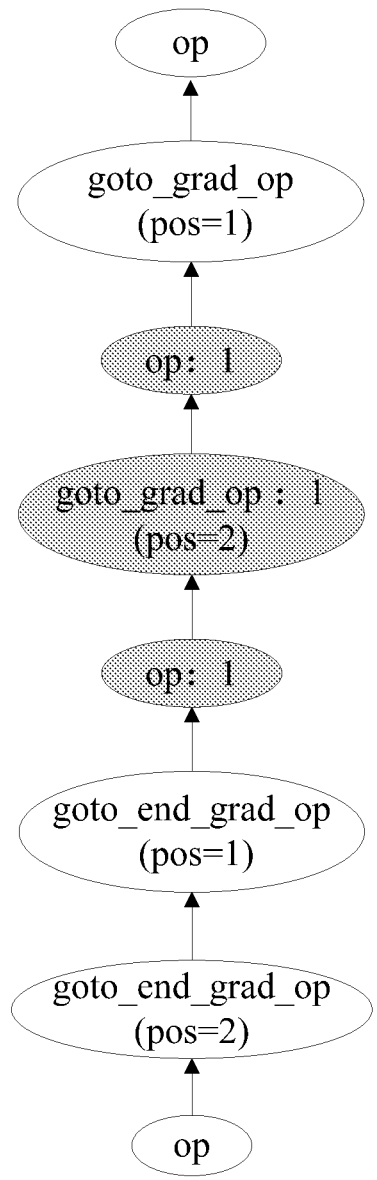
FIG. 8 is a third exemplary static computation graph according to an embodiment of the present application.

Take FIG. 8 as an example, which is an exemplary diagram of a reverse network corresponding to the forward network of FIG. 7. In FIG. 8, when the step is executed to goto_end_grad_op (pos=2), goto_end_grad_op (pos=2) does not output pos=2 because goto_end_op (pos=2) in FIG. 7 has no record of clearing the tag pos=2; next, goto_end_grad_op (pos=1) is executed, and since goto_end_op (pos=1) in FIG. 7 has a record of clearing the tag pos=1, output pos=1 is executed so that subsequent op transmits the tag pos=1 and stop transmitting until goto_grad_op (pos=1) is reached. Based on the above design, nodes that are not executed in the forward network of FIG. 7 and the reverse network of FIG. 8 are kept consistent.

Figure 9:
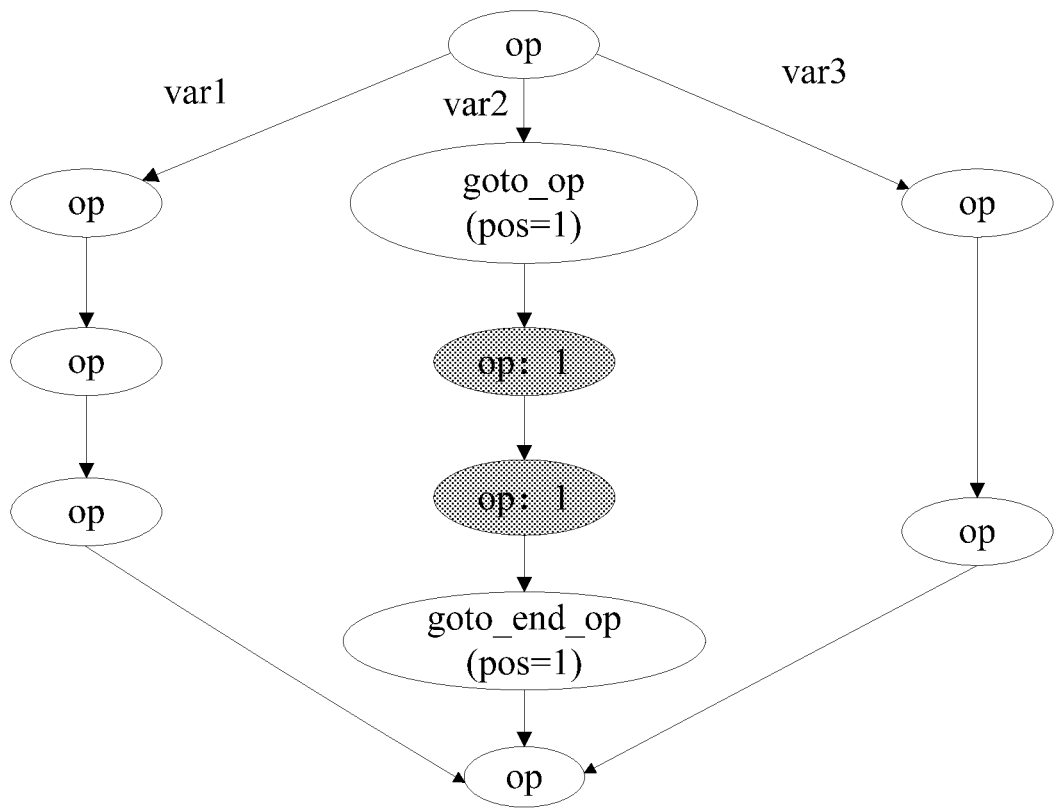
FIG. 9 is a fourth exemplary static computation graph according to an embodiment of the present application.

Furthermore, in the embodiment of the present application, input and output variable parameters vars are used for the start node and the end node, so that the start node and the end node can be configured with a very complex structure in graph representation: in the modern deep learning framework, the networking of recurrent neural networks is not necessarily linear as the middle layer or the bottom layer of a compiler, the structure of the recurrent neural networks is complex, and a stronger parallel network may be desired, so these variables can be used to indicate a more complex network structure for goto_op and goto_end_op to skip, thereby realizing flexible configuration of the neural networks, which is illustrated below in connection with FIG. 9.

Referring to FIG. 9, the output of the first op in FIG. 9 is divided into three branches of var1, var2 and var3 from left to right, for example, the input and output variable parameters used for goto_op are var2. At this time, the start node can be configured on the second branch, and similarly, the input and output parameters of goto_end_op can be correspondingly configured to determine the position of goto_end_op. As can be seen from FIG. 9, at this time, by controlling the output of the preceding node op of goto_op, it is possible to start skipping the nodes between goto_op and goto_end_op without waiting for the op of the left and right branches. FIG. 9 is merely an example, and in other embodiments, it may also be possible to control goto_end_op by configuring the input variable of goto_end_op to include the output of op from the left and right branches, so that goto_end_op needs to wait for the left branch to complete execution, merge, and execute the subsequent branches. As can be seen, the design of the variable Vars enables the start node and the end node to be configured with very complex structures in the graphical representation.

The principle described above for implementing the start node and end node is applicable to the first start node, the first end node, the second start node and the second end node.

In summary, the embodiment of the present application realizes the continue or break function of the recurrent neural network based on the start node and the end node, eliminates redundant operation and improves the operation efficiency of the neural network.

Correspondingly, the embodiment of the application provides a data processing apparatus based on a recurrent neural network, the recurrent neural network includes a plurality of recurrent units, each recurrent unit includes a plurality of data processing nodes, wherein each recurrent unit further includes a first start node, at least one of the recurrent units further includes a first end node, and at least one of the data processing nodes is included between the first start node and the first end node.

Figure 10:
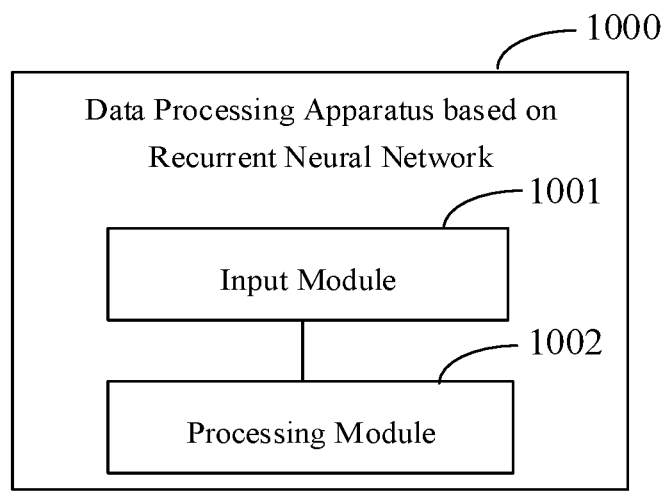
FIG. 10 is a block diagram of a data processing apparatus based on a recurrent neural network according to an embodiment of the present application.

Referring to FIG. 10, a data processing apparatus 1000 based on a recurrent neural network includes:

an input module 1001 configured for inputting a plurality of target processing objects into a plurality of recurrent units, respectively;

a processing module 1002 configured for sequentially processing the respective target processing objects by the plurality of data processing nodes in the respective recurrent units, to obtain a plurality of processing results output by the plurality of recurrent units;

wherein the plurality of recurrent units include a first recurrent unit, whether a first target processing object satisfies a first preset condition is judged during the processing of the first target processing object in the first recurrent unit, in a case that the first target processing object does not satisfy the first preset condition, no processing is performed by the data processing nodes between the first start node and the first end node during the processing of the first target processing object by the plurality of data processing nodes in the first recurrent unit.

In an embodiment, the processing module 1002 is further configured for: starting the first start node to add a first tag to the data processing nodes subsequent to the first start node and stopping addition of the first tag in response to reaching the first end node, and no processing being performed by the data processing nodes with the first tag.

In an embodiment, the processing module 1002 is further configured for: no processing being performed by the first start node in the first recurrent unit in a case that the first target processing object satisfies the first preset condition, and processing being performed on the first target processing object by the plurality of data processing nodes in the first recurrent unit.

In an embodiment, the first end node is provided as the first node of each recurrent unit.

In an embodiment, the first end node is provided downstream in the last one of the plurality of recurrent units.

In an embodiment, each recurrent unit further includes a second start node, the at least one recurrent unit further includes a second end node, the second start node is located between the first start node and the first end node, and a second preset condition is provided with respect to each recurrent unit; the processing module is further configured for:

judging whether the first target processing object satisfies a second preset condition during the processing of a first target processing object in a first recurrent unit, in a case that the first target processing object satisfies a first preset condition;

no processing being performed by the data processing nodes between the second start node and the second end node during the processing of the first target processing object by the plurality of data processing nodes in the first recurrent unit, in a case that the first target processing object does not satisfy the second preset condition.

In an embodiment, the processing module 1002 is further configured for:

starting the second start node to add a second tag to a data processing node subsequent to the second start node and stop addition of the second tag in response to reaching a second end node, and no processing being performed by the data processing nodes with the second tag.

In an embodiment, both the first start node and the first end node carry a first tag; the processing module 1002 is further configured for:

running the first start node to obtain variable parameters carrying the first tag;

sequentially transmitting the variable parameters carrying a first tag by the data processing nodes subsequent to the first start node;

in a case that the variable parameters carrying the first tag are transmitted to the first end node, the first tag carried by the variable parameters is the same as the first tag carried by the first end node, and the first end node clears the first tag carried by the variable parameters.

In an embodiment, the target processing objects include at least one of: video files, audio files, image files, and text files.

According to the embodiments of the present application, the present application also provides an electronic device and a readable storage medium.

Figure 11:
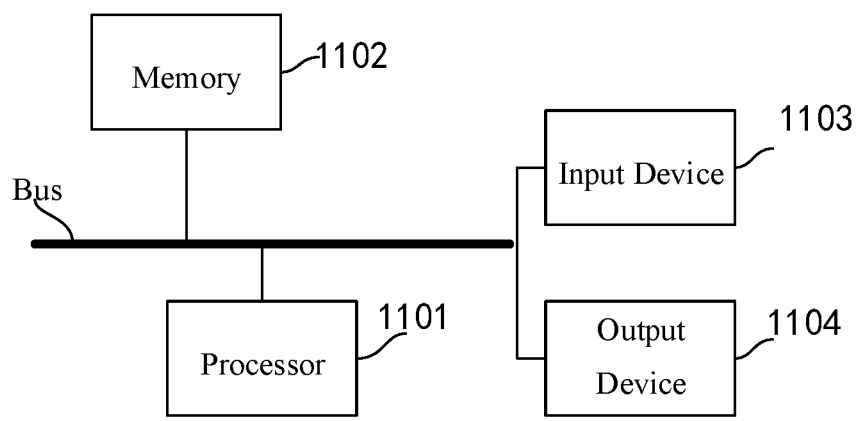
FIG. 11 is a block diagram of an electronic device for implementing a data processing method based on a recurrent neural network according to an embodiment of the present application.

FIG. 11 is a block diagram of an electronic device of a data processing method based on a recurrent neural network according to an embodiment of the present application. Electronic devices are intended to represent various forms of digital computers, such as laptop computers, desktop computers, workstations, personal digital assistants, servers, blade servers, mainframe computers, and other suitable computers. Electronic devices may also represent various forms of mobile devices, such as personal digital processing, cellular telephones, smart phones, wearable devices, and other similar computing devices. The components shown herein, their connections and relationships, and their functions are by way of example only and are not intended to limit the implementations of the present application described and/or claimed herein.

As shown in FIG. 11, the electronic device includes: one or more processors 1101, memory 1102, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in memory or on memory to display graphical information of the GUI on an external input/output device, such as a display device coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). An example of a processor 1101 is shown in FIG. 11.

Memory 1102 is a non-transitory computer-readable storage medium provided herein. Therein, the memory stores instructions executable by at least one processor to enable the at least one processor to implement the data processing method based on the recurrent neural network provided herein. The non-transitory computer-readable storage medium of the present application stores computer instructions for enabling a computer to implement the data processing method based on the recurrent neural network provided herein.

Memory 1102, as a non-transitory computer-readable storage medium, may be used to store non-transitory software programs, non-transitory computer-executable programs, and modules, such as program instructions/modules (e.g., the input module 1001 and the processing module 1002 shown in FIG. 10) corresponding to the data processing method based on the recurrent neural network of embodiments of the present application. The processor 1101 executes various functional applications of the server and data processing, i.e., a method of implementing the recurrent neural network-based data processing method in the above-mentioned method embodiment, by operating non-transient software programs, instructions, and modules stored in the memory 112.

The memory 1102 can include a program storage area and a data storage area, wherein the program storage area may store an application program required by an operating system and at least one function; the data storage area may store data created according to the use of the electronic device of the data processing method based on the recurrent neural network, etc. In addition, memory 1102 may include high speed random access memory, and may also include non-transitory memory, such as at least one magnetic disk storage device, flash memory device, or other non-transitory solid state memory device. In some embodiments, memory 1102 may optionally include memory remotely located with respect to processor 1101, which may be connected via a network to an electronic device of a data processing method based on a recurrent neural network. Examples of such networks include, but are not limited to, the Internet, intranet, local area networks, mobile communication networks, and combinations thereof.

The electronic device of the method of the data processing method based on the recurrent neural network may further include: an input device 1103 and an output device 1104. The processor 1101, the memory 1102, the input device 1103, and the output device 1104 may be connected via a bus or otherwise. FIG. 11 takes a bus connection as an example.

The input device 1103 may receive input numeric or character information and generate key signal inputs related to user settings and functional controls of the electronic device of the recurrent neural network-based data processing method, such as input devices for touch screens, keypads, mice, track pads, touch pads, pointing sticks, one or more mouse buttons, track balls, joysticks, etc. The output devices 1104 may include display devices, auxiliary lighting devices (e.g., LEDs), tactile feedback devices (e.g., vibration motors), and the like. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuitry, integrated circuit systems, application specific integrated circuits (ASICs), computer hardware, firmware, software, and/or combinations thereof. These various embodiments may include: implementation in one or more computer programs which can be executed and/or interpreted on a programmable system including at least one programmable processor, and the programmable processor can be a dedicated or general-purpose programmable processor which can receive data and instructions from, and transmit data and instructions to, a memory system, at least one input device, and at least one output device.

These computing programs (also referred to as programs, software, software applications, or code) include machine instructions of a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide for interaction with a user, the systems and techniques described herein may be implemented on a computer having: a display device (e.g., a cathode ray tube (CRT) or liquid crystal display (LCD) monitor) for displaying information to a user; and a keyboard and a pointing device (e.g., a mouse or a trackball) by which a user can provide input to the computer. Other types of devices may also be used to provide interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background components, middleware components, or front-end components. The components of the system may be interconnected by any form or medium of digital data communication (e.g., a communication network). Examples of communication networks include: Local Area Networks (LANs), Wide Area Networks (WANs), and the Internet.

The computer system may include a client and a server. The client and the server are typically remote from each other and typically interact through a communication network. The relationship between the client and the server is generated by computer programs operating on respective computers and having a client-server relationship with each other.

According to the technical solution of the embodiment of the application, the function of continue or break of the recurrent neural network is realized, redundant operation is eliminated, and the operating efficiency of the neural network is improved.

It will be appreciated that the various forms of flow, reordering, adding or removing steps shown above may be used. For example, the steps recited in the present application may be performed in parallel or sequentially or may be performed in a different order, so long as the desired results of the technical solutions disclosed in the present application can be achieved, and no limitation is made herein.

The above-mentioned embodiments are not to be construed as limiting the scope of the present application. It will be apparent to a person skilled in the art that various modifications, combinations, sub-combinations and substitutions are possible, depending on design requirements and other factors. Any modifications, equivalents, and improvements within the spirit and principles of this application are intended to be included within the scope of the present application.

What is claimed is:

1. A data processing method based on a recurrent neural network, the recurrent neural network comprises a plurality of recurrent units, each recurrent unit comprises a plurality of data processing nodes, wherein each recurrent unit further comprises a first start node, at least one of the recurrent units further comprises a first end node, at least one of the data processing nodes is included between the first start node and the first end node, and the data processing method based on the recurrent neural network comprises:
   inputting a plurality of target processing objects into the plurality of recurrent units, respectively;
   sequentially processing the respective target processing objects by the plurality of data processing nodes in the respective recurrent units, to obtain a plurality of processing results output by the plurality of recurrent units;
   wherein the plurality of recurrent units comprise a first recurrent unit, judging whether a first target processing object satisfies a first preset condition during the processing of the first target processing object in the first recurrent unit, and in a case that the first target processing object does not satisfy the first preset condition, no processing being performed by the data processing nodes between the first start node and the first end node during the processing of the first target processing object by the plurality of data processing nodes in the first recurrent unit;
   wherein the method further comprises:
   in a case that the first target processing object satisfies the first preset condition, no processing being performed by the first start node in the first recurrent unit and processing being performed on the first target processing object by the plurality of data processing nodes in the first recurrent unit;
   wherein each recurrent unit further comprises a second start node, the at least one of the recurrent units further comprises a second end node, the second start node is located between the first start node and the first end node, and a second preset condition is provided with respect to each recurrent unit;
   during the processing of the first target processing object in the first recurrent unit, the data processing method further comprises: judging whether the first target processing object satisfies the second preset condition, in a case that the first target processing object satisfies the first preset condition; no processing being performed by the data processing nodes between the second start node and the second end node during the processing of the first target processing object by the plurality of data processing nodes in the first recurrent unit, in a case that the first target processing object does not satisfy the second preset condition;
   wherein the target processing objects comprise at least one of video files, audio files, or image files.

2. The data processing method according to claim 1, wherein the no processing being performed by the data processing nodes between the first start node and the first end node, comprises:
   starting the first start node to add a first tag to one or more data processing nodes subsequent to the first start node and stop addition of the first tag in response to reaching the first end node, and no processing being performed by the one or more data processing nodes with the first tag.

3. The data processing method of claim 2, wherein
   both the first start node and the first end node carry the first tag;
   the starting the first start node to add the first tag to the one or more data processing nodes subsequent to the first start node and stop addition of the first tag in response to reaching the first end node, comprises:
   running the first start node to obtain variable parameters carrying the first tag;
   sequentially transmitting the variable parameters carrying the first tag by the one or more data processing nodes subsequent to the first start node; and
   in a case that the variable parameters carrying the first tag are transmitted to the first end node, the first tag carried by the variable parameters is the same as the first tag carried by the first end node, and the first end node clears the first tag carried by the variable parameters.

4. The data processing method of claim 1, wherein the first end node is provided as a first node of each recurrent unit.

5. The data processing method of claim 1, wherein the first end node is provided downstream in the last one of the plurality of recurrent units.

6. The data processing method according to claim 1, wherein the no processing being performed by the data processing nodes between the second start node and the second end node, comprises:
   starting the second start node to add a second tag to a data processing node subsequent to the second start node and stop addition of the second tag in response to reaching the second end node, and no processing being performed by the data processing nodes with the second tag.

7. A data processing apparatus based on a recurrent neural network, the recurrent neural network comprising a plurality of recurrent units, each recurrent unit comprises a plurality of data processing nodes, wherein each recurrent unit further comprises a first start node, at least one of the recurrent units further comprises a first end node, at least one of the data processing nodes is included between the first start node and the first end node, and the data processing apparatus based on the recurrent neural network comprises:
   a processor and a memory for storing one or more computer programs executable by the processor,
   wherein when executing at least one of the computer programs, the processor is configured to perform operations comprising:
   inputting a plurality of target processing objects into the plurality of recurrent units, respectively;

causing the plurality of data processing nodes in the respective recurrent units to sequentially process the respective target processing objects, to obtain a plurality of processing results output by the plurality of recurrent units;

wherein the plurality of recurrent units comprise a first recurrent unit, when executing at least one of the computer programs, the processor is further configured to perform operations comprising:

judging whether a first target processing object satisfies a first preset condition during the processing of the first target processing object in the first recurrent unit, and in a case that the first target processing object does not satisfy the first preset condition, causing the data processing nodes between the first start node and the first end node to perform no processing during the processing of the first target processing object by the plurality of data processing nodes in the first recurrent unit;

wherein when executing at least one of the computer programs, the processor is further configured to perform operations comprising:

in a case that the first target processing object satisfies the first preset condition, no processing being performed by the first start node in the first recurrent unit and processing being performed on the first target processing object by the plurality of data processing nodes in the first recurrent unit;

wherein each recurrent unit further comprises a second start node, the at least one of the recurrent units further comprises a second end node, the second start node is located between the first start node and the first end node, and a second preset condition is provided with respect to each recurrent unit; when executing at least one of the computer programs, the processor is further configured to perform operations comprising: judging whether the first target processing object satisfies the second preset condition during the processing of the first target processing object in the first recurrent unit, in a case that the first target processing object satisfies the first preset condition; causing the data processing nodes between the second start node and the second end node to perform no processing during the processing of the first target processing object by the plurality of data processing nodes in the first recurrent unit, in a case that the first target processing object does not satisfy the second preset condition;

wherein the target processing objects comprise at least one of video files, audio files, or image files.

8. The data processing apparatus of claim 7, wherein when executing at least one of the computer programs, the processor is further configured to perform operations comprising:

starting the first start node to add a first tag to one or more data processing nodes subsequent to the first start node and stop addition of the first tag in response to reaching the first end node, and no processing being performed by the one or more data processing nodes with the first tag.

9. The data processing apparatus of claim 8, wherein both the first start node and the first end node carry the first tag;

when executing at least one of the computer programs, the processor is further configured to perform operations comprising:

running the first start node to obtain variable parameters carrying the first tag;

causing the one or more data processing nodes subsequent to the first start node to sequentially transmit the variable parameters carrying the first tag; and in a case that the variable parameters carrying the first tag are transmitted to the first end node, the first tag carried by the variable parameters is the same as the first tag carried by the first end node, causing the first end node to clear the first tag carried by the variable parameters.

10. The data processing apparatus of claim 7, wherein the first end node is provided as a first node of each recurrent unit.

11. The data processing apparatus of claim 7, wherein the first end node is provided downstream in the last one of the plurality of recurrent units.

12. The data processing apparatus of claim 7, wherein when executing at least one of the computer programs, the processor is further configured to perform operations comprising:

starting the second start node to add a second tag to a data processing node subsequent to the second start node and stop addition of the second tag in response to reaching the second end node, and causing the data processing nodes with the second tag to perform no processing.

13. A non-transitory computer-readable storage medium storing computer instructions for causing the computer to perform a data processing method based on a recurrent neural network, wherein the recurrent neural network comprises a plurality of recurrent units, each recurrent unit comprises a plurality of data processing nodes, wherein each recurrent unit further comprises a first start node, at least one of the recurrent units further comprises a first end node, at least one of the data processing nodes is included between the first start node and the first end node, and the computer is caused to perform the data processing method comprising:

inputting a plurality of target processing objects into the plurality of recurrent units, respectively;

sequentially processing the respective target processing objects by the plurality of data processing nodes in the respective recurrent units, to obtain a plurality of processing results output by the plurality of recurrent units;

wherein the plurality of recurrent units comprise a first recurrent unit, judging whether a first target processing object satisfies a first preset condition during the processing of the first target processing object in the first recurrent unit, and in a case that the first target processing object does not satisfy the first preset condition, no processing being performed by the data processing nodes between the first start node and the first end node during the processing of the first target processing object by the plurality of data processing nodes in the first recurrent unit;

wherein the computer is caused to perform the data processing method further comprising:

in a case that the first target processing object satisfies the first preset condition, no processing being performed by the first start node in the first recurrent unit and processing being performed on the first target processing object by the plurality of data processing nodes in the first recurrent unit;

wherein each recurrent unit further comprises a second start node, the at least one of the recurrent units further comprises a second end node, the second start node is located between the first start node and the first end node, and a second preset condition is provided with respect to each recurrent unit;

wherein the computer is caused to perform the data processing method further comprising:

judging whether the first target processing object satisfies the second preset condition during the processing of the first target processing object in the first recurrent unit, and in a case that the first target processing object satisfies the first preset condition; and causing the data processing nodes between the second start node and the second end node to perform no processing during the processing of the first target processing object by the plurality of data processing nodes in the first recurrent unit and in a case that the first target processing object does not satisfy the second preset condition;

wherein the target processing objects comprise at least one of video files, audio files, or image files.

14. The non-transitory computer-readable storage medium of claim 13, wherein the computer is caused to perform the no processing being performed by the data processing nodes between the first start node and the first end node in the following manner:

starting the first start node to add a first tag to one or more data processing nodes subsequent to the first start node and stop addition of the first tag in response to reaching the first end node, and no processing being performed by the one or more data processing nodes with the first tag.

15. The non-transitory computer-readable storage medium of claim 13, wherein the first end node is provided as a first node of each recurrent unit.

16. The non-transitory computer-readable storage medium of claim 13, wherein the first end node is provided downstream in the last one of the plurality of recurrent units.

17. The non-transitory computer-readable storage medium of claim 13, wherein the computer is caused to perform the no processing being performed by the data processing nodes between the second start node and the second end node in the following manner:

starting the second start node to add a second tag to a data processing node subsequent to the second start node and stop addition of the second tag in response to reaching the second end node, and no processing being performed by the data processing nodes with the second tag.

* * * * *